Jan. 10, 1950     T. M. FERRILL, JR     2,493,755
VEHICLE SPEED AND PATH SIGNALING SYSTEM
Filed Feb. 24, 1944     4 Sheets-Sheet 1
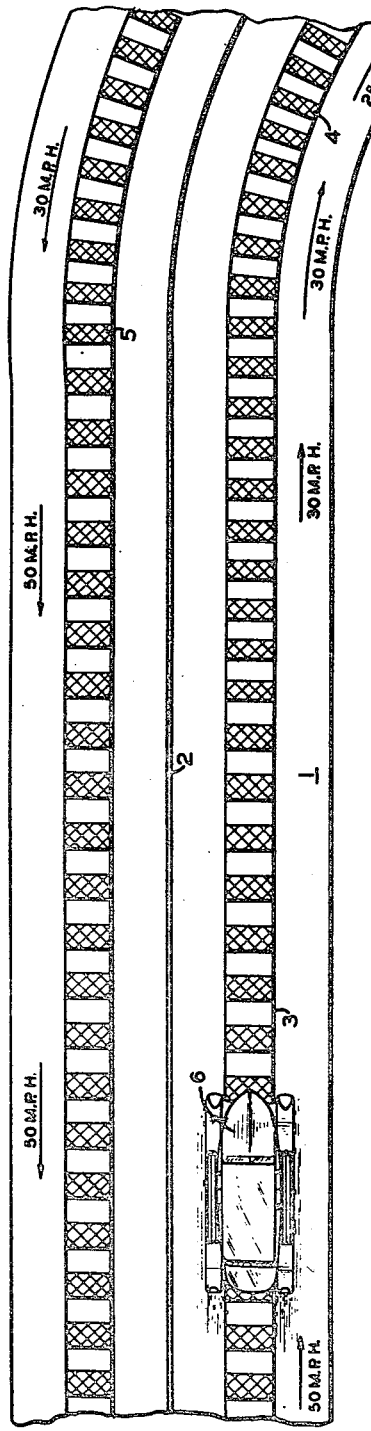
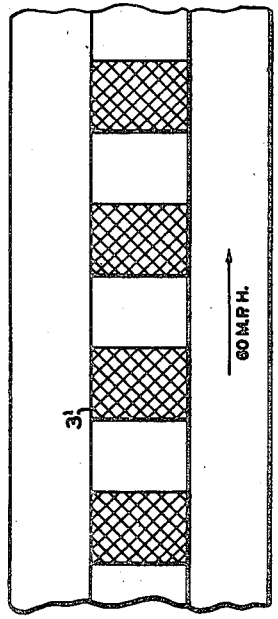
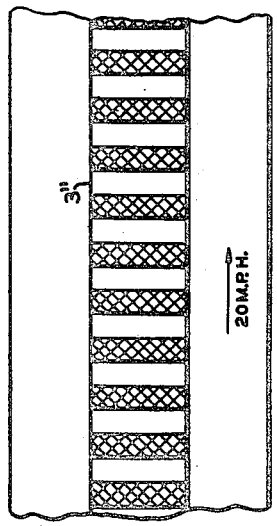
INVENTOR
Thomas M. Ferrill, Jr.

Jan. 10, 1950     T. M. FERRILL, JR     2,493,755

VEHICLE SPEED AND PATH SIGNALING SYSTEM

Filed Feb. 24, 1944     4 Sheets-Sheet 2

INVENTOR

Thomas M. Ferrill, Jr.

Jan. 10, 1950 T. M. FERRILL, JR 2,493,755
VEHICLE SPEED AND PATH SIGNALING SYSTEM
Filed Feb. 24, 1944 4 Sheets-Sheet 3

INVENTOR
Thomas M. Ferrill, Jr.

Jan. 10, 1950         T. M. FERRILL, JR         2,493,755
VEHICLE SPEED AND PATH SIGNALING SYSTEM
Filed Feb. 24, 1944                              4 Sheets-Sheet 4

INVENTOR
Thomas M. Ferrill, Jr.

Patented Jan. 10, 1950

2,493,755

UNITED STATES PATENT OFFICE 2,493,755

VEHICLE SPEED AND PATH SIGNALING SYSTEM

Thomas M. Ferrill, Jr., Hempstead, N. Y.

Application February 24, 1944, Serial No. 523,737

30 Claims. (Cl. 180—82)

This invention relates primarily to systems for steering control of dirigible craft, and to systems for speed control of vehicles adapted to travel along predetermined paths. Applications for the invention include steering control and speed control of automobiles, speed control for rail road vehicles, and steering control and speed control for aircraft while operated on the ground, as in take-off runs, landing runs, and taxiing operations.

The invention will be described particularly as applied to guidance and speed control of an automobile along a highway especially prepared for automatic vehicle control.

A survey may be made to determine desirable speeds and precise path for motor vehicles along the highway. Based on data obtained from the survey, a track may be made upon the road surface, built into the paving of the road, or fixedly positioned with respect to the road for signalling guidance and speed control information to receiving apparatus carried by the vehicle.

Speed control is achieved through the use of alternate zones along the track, which may be used in cooperation with an appropriate receiver on the vehicle to generate an alternating current signal in electrical circuits during motion of the vehicle along the track. The track and the receiver may be adapted for photoelectric, magnetic, or mechanical coupling, as desired. The length of the alternate zones or areas in a section of the track is made proportional to the intended speed of the vehicle along that section of track.

If the vehicle operates at all times at the proper speeds, the alternating current signal produced in the receiver by movement of the vehicle along the track, and the resultant traversal of the alternate zones of the track, is a constant-frequency signal, the frequency being a predetermined value used as a factor in the design of the track. Operation of the vehicle at higher speed will cause a higher-frequency signal to be generated, while operation at a speed slower than that on which the alternate zone dimensions are based will cause the generation of a frequency proportionately lower than the predetermined normal frequency.

Steering control of the vehicle is executed according to a comparison of the amplitude of an alternating current signal produced by the traversal of alternate zones of the track, with another signal, which, for example, may also be produced by traversal of the alternate zones of the track. Two separate sensitive pick-up devices may be so positioned on the vehicle as to be normally disposed for cooperation in an equal extent with the alternate zones of the track, as the vehicle moves in the predetermined desirable path. Upon digression of the vehicle to the right of this path, the pick-up device at the left receives a greater amplitude signal, while that at the right receives a reduced signal. A departure to the left causes the reverse results. A device may then be provided in which the amplitude of the signal produced through the right-hand sensitive device is compared with the amplitude of the signal produced through the left-hand sensitive pick-up device, and the vehicle may be steered according to the difference of these signal amplitudes.

It is an object of this invention to control the speed of a vehicle in accordance with the physical length of alternate zones or areas of a control track.

Another object is to provide an improved system for automatic control of the steering of a vehicle along a signalling track.

Another object of this invention is to provide a signalling track along a highway and a cooperating receiver in a vehicle for deriving steering and speed control information from the track during progress of the vehicle along the track.

A further object is to provide a method of indicating the speed of a vehicle relative to a predetermined speed.

Another object is to provide a system for indicating the digression of a vehicle from a predetermined path.

Further objects will become apparent from the description which follows, taken in conjunction with the drawings, of which:

Fig. 1 is a plan view of a roadway, each traffic lane of which is provided with a photoelectric signalling track for steering and speed control of vehicles;

Figs. 2 and 3 are enlarged plan views of sections of the photoelectric control track adapted for two different speeds, as twenty miles per hour and sixty miles per hour, respectively;

Figure 14:
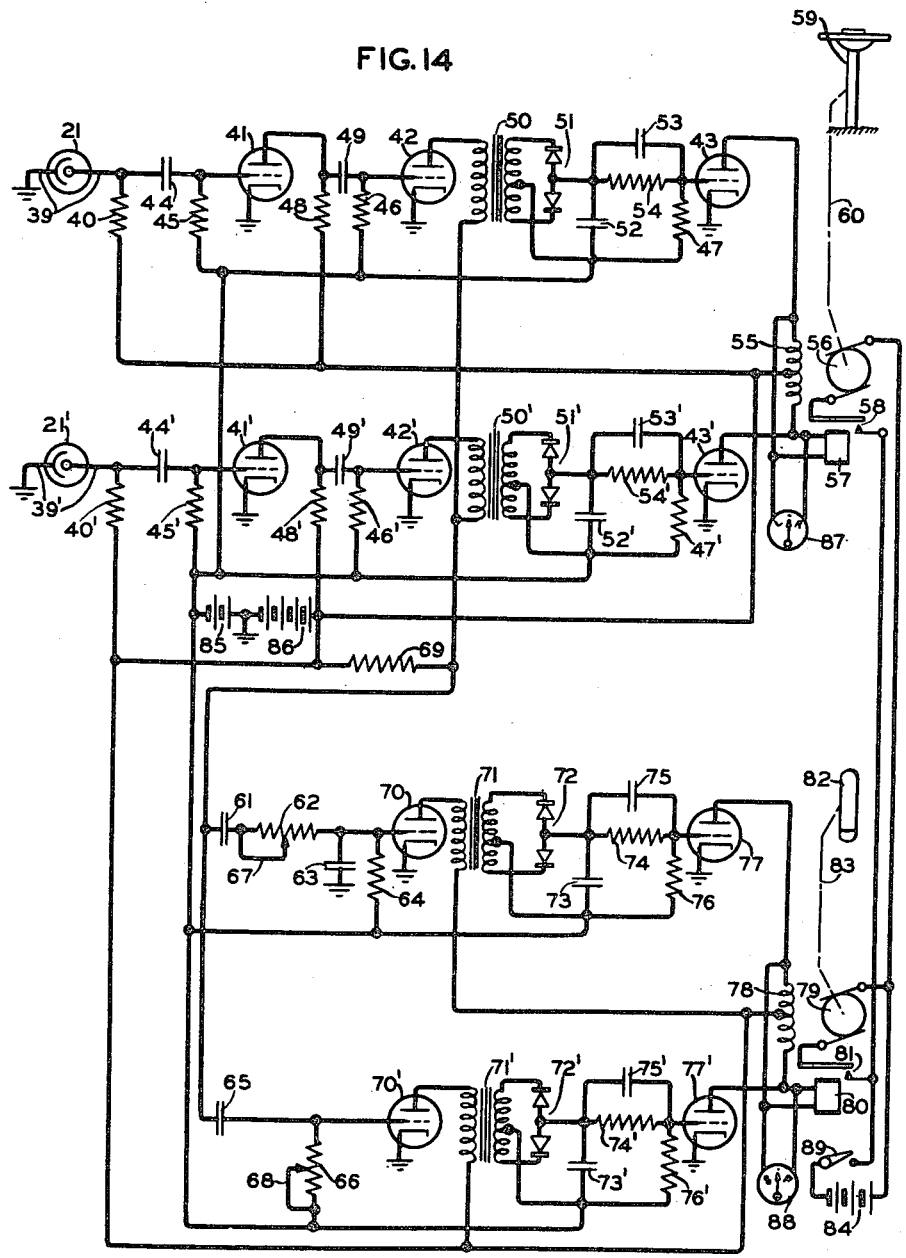

And Fig. 14 is a circuit diagram of a photoelectric receiving system and servomotor system for speed and steering indication and control of a vehicle such as an automobile.

A portion of a highway 1 is shown in Fig. 1, with one traffic lane in each direction. A dividing line between lanes is shown at 2. An automobile 6 is shown traveling on a straight portion of the road, along a section of photoelectric signal track 3 having alternate light and dark areas so dimensioned as to signal a speed of, for example, 50 miles per hour to the vehicle, the latter being equipped with a special control receiver, as will be described. The arrows and numeral designations along the track denote the signalling speeds for which the alternations are dimensioned. As the vehicle proceeds along the straight section of the track, the lengths of the alternations or alternate zones traversed in the direction of travel are progressively narrowed, so that the vehicle will be decelerated to a speed such, for example, as 30 miles per hour preparatory to entering the curve, as will be described. Within the curve, the spacing of the alternations is further reduced so that along sharply curved section 4 of track 3, the speed of the vehicle 6 will be reduced further, e. g., to 25 miles per hour.

A similar track 5, intended for guidance and speed control of vehicles traveling in the opposite direction, is designed to reduce the speed of vehicles to a safe minimum velocity such as 30 miles per hour along the curved portion of the roadway, while signalling the vehicle to return to a normal speed, e. g., 50 miles per hour, upon reaching the straight section of the roadway.

By reference to Fig. 2 and Fig. 3, the method of dimensioning the track according to speed is clearly shown. In this embodiment of the invention, the width of the track is maintained uniform, while the length of the alternate dark and light areas or zones is made proportional to the speed intended. Thus, the length as well as the spacing of the relatively light or highly reflective zones along the track is made proportional to the predetermined speed at which the vehicle is to travel therealong. The length of the alternate zones of track 3" in Fig. 2, intended for signalling a speed of 20 miles per hour, is one-third the length of the alternations of track 3' shown in Fig. 3, for 60 miles per hour. This series of alternate areas concatenated along the vehicle path thus constitutes a record of the path and of recommended speed variations for travel therealong.

An illustrative desirable frequency for the alternating signals to be produced in the vehicle is 50 cycles per second; for such a frequency, 50 dark areas and 50 light areas are provided in a distance of 88 feet in the 60-mile per hour track section of Fig. 3, and three times this number of alternate dark and light areas are provided in the same distance in the 20-mile per hour section of Fig. 2.

Figure 4:
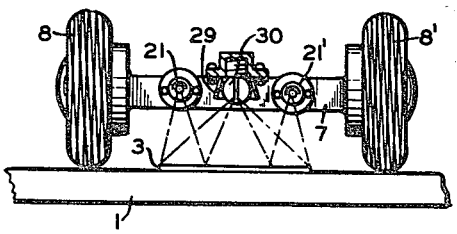
Figs. 4 and 5 are front elevation and plan view, respectively, of photoelectric cell pick-up devices and a light source attached in operative position on a suitable vehicle, e. g., on the front axle of an automobile.
Figure 5:
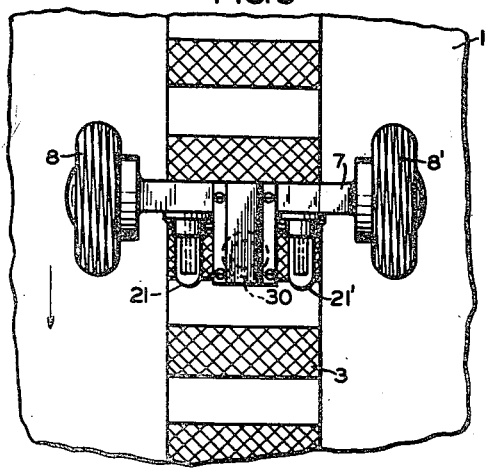

Referring now to Figs. 4 and 5, front axle 7, right front wheel 8, and left front wheel 8' of vehicle 6 are shown positioned in normal relation to the photoelectric signalling track 3. The right and left photocells, 21 and 21', respectively, are shown attached to front axle 7 so as to extend slightly forward therefrom. A light source, comprising reflector 29 and electric lamp 30, is shown attached to the front axle midway between the pick-up units. The broken lines of Fig. 4 diagrammatically illustrate the manner in which each of the photocells receives reflected light from an appreciable area of track 3.

Fig. 14 is a circuit diagram of a complete receiver showing how the photoelectric pick-up units effect the desired control action. The right-hand photoelectric cell 21, which may be a high-vacuum phototube or a gaseous phototube, is supplied from a direct-current source such as battery 86, through resistor 40. Upon motion of the receiver along the photoelectric track 3, an alternating electromotive force is impressed on the grid of amplifier tube 41 through coupling condenser 44.

The amplified alternating output voltage of tube 41 is impressed through coupling condenser 49 on the grid of a second amplifier 42. Transformer 50, having a primary winding connected in series with the plate supply to tube 42, has a center-tapped secondary winding connected to a full-wave rectifier 51, which may be a miniature copper-oxide rectifier, for example. Condenser 52 is connected across the output terminals of the rectifier system, to provide some suppression of the harmonic-frequency ripple voltage resulting from the full-wave rectification. Part of the direct electromotive force produced by the rectifier system is applied though parallel resistor 54 and condenser 53 to the grid of tube 43. The plate current for tube 43 flows from source 86 through one-half of a center-tapped motor field winding 55.

A similar alternating current amplifier, rectifier, and diect-current amplifier system, comprising tubes 41', 42' and 43' and associated components, operates similarly in accordance with the alternating current output signals from the left phototube 21' to cause a flow of direct current through the other half of center-tapped field winding 55.

When the alternating output signals from the left and right photoelectric cells or phototubes are maintained equal, the direct potentials applied to the grids of direct-current amplifiers 43 and 43' are equal, causing equal direct currents to flow toward the plates of the amplifier tubes 43 and 43' through the two opposed halves of winding 55. No net direct magnetomotive force is thus generated in the field of steering motor 55, 56, so that no torque results in armature 56.

If desired, the switching contacts 58 of a relay may be connected in series with armature 56, so that no current is allowed to flow from source 84 through the armature unless a predetermined minimum field strength is developed. Field winding 57 of the relay is shown connected to the end terminals of field winding 55 of the steering motor.

A zero-center, direct-current voltmeter 87, connected between the plates of tubes 43 and 43', may be calibrated to indicate the digression of the vehicle from the path defined by the track.

The direct-current motor armature 56 may be mechanically connected to the steering mechanism of the vehicle, as for example, through a suitable link of speed reduction gears. This link is schematically indicated in Fig. 14 by link 60 extending to the steering shaft 59. The direction of operation of the steering motor is such as to steer the vehicle to the left when the left photocell unit receives a greater signal than the right photocell.

Resistors 45, 46, and 47 serve to apply the correct direct bias potentials from source 85 to the grids of alternating current and direct current amplifier tubes, respectively. Resistor 47 serves a further function as an element of a voltage divider, of which the parallel-connected combination of condenser 53 and resistor 54 form the other leg.

During periods of constant amplitude alternating current output from photocell 21, a constant direct potential is applied by rectifier 51 and filter condenser 52 to the voltage divider, and the ratio of the resistance 47 to the sum of resistances 47 and 54 determines the fraction of this rectified potential applied to the grid circuit of tube 43.

If the vehicle is travelling precisely along the track, the direct voltages across capacitors 52 and 52' are equal and constant, and equal fractional parts of these voltages result across resistors 47 and 47', so that the output currents of tubes 43 and 43' are mutually cancelling in field winding 55. Hence, no corrective action is exerted upon the steering arrangement 59 by the motor at this time. The above conditions may correspond to straight-line progress of the vehicle along a straight section of track, or to curvilinear progress of the vehicle along an arcuate track section, as with steerable front wheels deflected to the rightward the proper extent as the vehicle proceeds along a curve to the right.

During an increase of the alternating current signal from photocell 21, due to digression of the vehicle 6 to the left with respect to the track 3, condenser 53 is effective in conjunction with resistance 54 in determining the relative potential applied to the grid of tube 43, causing a relatively great increase of potential during the period of rising signal strength. This is due to the fact that the voltage across resistor 54 cannot change as rapidly with capacitor 53 connected there across as would be the case with capacitor 53 omitted. Capacitor 53 receives an increasing charge as the voltage at the output of rectifier 51 increases, and the charging effect therein limits the voltage rise rate across resistor 54. Consequently, resistor 47 receives a greater-than-normal fraction of the rectifier output voltage.

During all this while with the leftward movement of the vehicle relative to the track, the amplitude of the alternating signal from unit 21' and amplifier system 41', 42' is decreasing, so that a decreasing unidirectional voltage is produced at the output of rectifier 51'. Capacitor 53' here also tends to hold the voltage across resistor 54' constant, so that the voltage across resistor 47' is made to decrease at an abnormal rate.

As a consequence of the enhanced rise of voltage across resistor 47 and enhanced decrease of voltage across resistor 47', very prompt and drastic corrective action is applied to the steering system, deflecting steerable wheels of the vehicle to the rightward. This brings the vehicle to tend to intersect the track and cross it, but as the vehicle front approaches the position with the signal pick-up system centered with respect to the track, the greater voltage across capacitor 52 decreases and the lesser voltage across capacitor 52' increases. Now, resistor 47 receives only a small share of the voltage across capacitor 52, whereas resistor 47' receives a great share of the voltage across capacitor 52'. Hence, before the vehicle has progressed to a sufficient extent rightwardly to return the pick-up apparatus to a position directly above the track, and thus before the voltages across capacitors 52 and 52' have been equalized, the voltages across resistors 47 and 47' have momentarily been balanced, the rightward deflection of the steerable apparatus being stopped.

The vehicle continues toward the track and the voltage across resistor 47' now exceeds that across resistor 47, even though the voltage across capacitor 52 still exceeds that across capacitor 52'. This results in operation of the steering control motor in the opposite direction, tending to turn the wheels to the leftward.

The action of the displacement signal and rate enhancement circuits is so amplified in stages 43, 43' as to cause the motor to act to govern the steering in such a way as to tend to keep the algebraic sum of displacement and rate of change of displacement zero, the condition prevailing with the voltages across resistors 47 and 47' equal. Prompt and efficient action to counteract a departure from course, and pre-reversal of steering action for asymptotic return to course are thereby assured. Thus, a rate-of-change responsive circuit may be used in the steering system to produce smooth steering control, free from hunting.

A resistor 69 is connected in series with the direct current supply of tubes 42 and 42'. This resistor is of a value small relative to the primary impedances of transformers 50 and 50' as connected, so that a small alternating voltage will be developed across the resistor when photoelectric cells or phototubes 21 and 21' move along in relation to track 3.

The voltage developed across resistor 69 is applied to the grid of amplifier tube 70 through coupling condenser 61 and a low-pass frequency discriminating filter consisting of resistors 62 and 64 and condenser 63. Resistor 64 serves also to apply bias to the grid of tube 70 from potential source 85. The voltage developed across resistor 69 is also applied to the grid of tube 70' through a high-pass filter consisting of condenser 65 and resistor 66. The values of circuit elements 61, 62, 63, 64, 65, and 66 are so proportioned that when the alternating voltage developed across resistor 69 is at a desired frequency, as, for example, 50 cycles per second, the amplitude of the voltage applied to the grid circuit of tube 70 will be equal to that applied to the grid of tube 70'. For the illustrative frequency of 50 cycles per second, condenser 61 may be 0.5 microfarad, condensers 63 and 65 may be of the order of 0.032 microfarad, resistor 64 may be of the order of 1 megohm, and resistors 62 and 66 may be of the order of 100,000 ohms.

With the voltage developed across resistor 69 at the chosen frequency for which the grid circuit excitation voltages of tubes 70 and 70' are equal, direct potentials of equal magnitude are applied to the grids of tubes 77 and 77' by the intervening circuits consisting of transformers 71 and 71', rectifiers 72 and 72', filters 73 and 73', and rate-responsive circuits 74, 75, 76 and 74', 75', 76', respectively. The method of operation of these circuits intervening between tubes 70 and 77, and between tubes 70' and 77', may be readily understood by reference to the above description of the steering control circuits associated with tubes 42 and 43.

With equal direct potentials applied to the grid circuits of tubes 77 and 77', equal values of direct current will be caused to flow through the opposed halves of speed-control motor field winding 78, with the result that no net effective magnetic field is produced in motor 78, 79. The speed control motor armature 79 may be connected to a speed control element 82 of vehicle 6, as by link 83. This speed control element 82 may be a fuel-supply control valve or throttle, or the braking means on the vehicle, or both. The circuit arrangement of the speed control motor with the end terminals of field winding 78 connected to the anodes of tubes 77 and 77', respectively, is such that when the alternating current signal amplitude applied to the grid of tube 70 exceeds that applied to the grid of tube 70', the motor operates in the direction of increasing the throttle fuel feed to increase the speed of the vehicle.

During acceleration or deceleration of the vehicle, relative to the speed for which the track is designed, rate responsive circuits, comprising resistor 74, condenser 75, and resistor 76, and similarly 74', 75', and 76', act to superimpose upon the speed displacement signal an additional signal representing the rate of change of displacement of the vehicle speed from the predetermined speed. If the speed of the vehicle is greater than that for which the track is designed, and is further increasing at a high rate, the difference of potentials of the grids of tubes 77 and 77' is greater than the potential corresponding to an equal but constant speed displacement. If, on the other hand, the speed of the vehicle is rapidly approaching the speed for which the track was designed, the grid potential difference of tubes 77 and 77' is lower than the value which would obtain with a similar constant speed displacement. Thus, the difference of anode currents of tubes 77 and 77', and accordingly the speed corrective operation of motor 78, 79, is determined by the rate as well as the extent of disgression of the vehicle speed from the speed on which the track design is based. Smooth control of the speed of the vehicle is thus effected in accordance with the longitudinal dimensions—the length and spacing—of the alternate areas or zones of the track.

A relay consisting of field winding 80 and armature 81 may be connected to motor 78, 79 to prevent the flow of supply current from battery 84 through the motor armature during the absence of a motor field energizing difference of potentials of the anodes of tubes 77 and 77'. Field winding 80 of the relay is connected to the end terminals of motor field winding 78, and the armature terminals of the relay are connected in series with motor armature 79 to open the armature circuit in the absence of motor field excitation.

A zero-center direct-current voltmeter 88 is shown connected to the end terminals of motor field winding 78. This meter is calibrated to indicate the speed of the vehicle relative to the predetermined speed for which the track is designed. During variation of the displacement of the vehicle speed relative to the track design speed, the indication of meter 88 is modified according to the rate of change of the vehicle speed relative to the track design speed, and the meter indication is thus suitable for guidance of the operator of the vehicle as to advisability of accelerating or decelerating the vehicle. During automatic operation of the vehicle, also, the operator is thus enabled to observe the need of correcting movement of the speed control element, and to study the manner in which the speed control motor responds to this need.

If the design of the speed control system is based on a signal frequency of 50 cycles, for example, and a reduction of the speed of the vehicle relative to the normal track speeds by a factor of 30 percent is deemed advisable, as determined by adverse weather conditions, the frequency discriminating filters which couple resistor 69 to the grids of tubes 70 and 70' may be readjusted for balanced output amplitudes at a reduced frequency such as 35 cycles. For convenient readjustment of the discriminating filters, resistors 62 and 66 may be manually adjustable, as by means of rheostat arms 67 and 68, respectively.

The principles of this invention are not limited to the photoelectric receiving elements and light transmission system described above. Other methods of rendering the receiving system carried by the vehicle responsive to a fixed track include electromagnetic signalling and mechanical signalling. Modified forms of the invention are shown in Figs. 6 to 13, inclusive.

Figure 6:
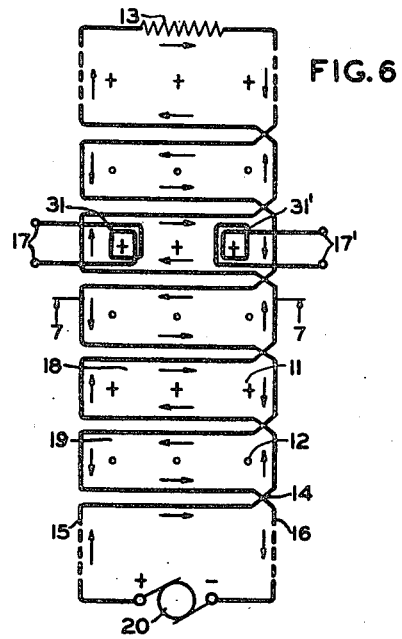
Fig. 6 is a plan view of a magnetic control track and related pick-up coils.
Figure 7:
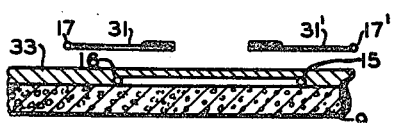
Fig. 7 is a sectional view taken on line 7—7 of Fig. 6.

In Figs. 6 and 7 are shown receiver pick-up coils 31 and 31', positioned above a signalling track formed by a direct current source 20, outgoing current conductor 15, resistor 13, and incoming current conductor 16. The conductors may be buried within the roadway surface paving 33, as shown in Fig. 7. Pick-up coils 31 and 31' replace right and left photoelectric cells 21 and 21', respectively, to render the equipment carried by the vehicle suitable for cooperation with the electromagnetic track. These coils may be attached to the front axle of the vehicle for support substantially in the positions indicated in Figs. 6 and 7, which show the axes of the coils to be vertical.

Conductors 15 and 16 are arranged as shown in Fig. 6, so that alternate loops of clockwise current paths and counterclockwise current paths are formed successively along the track. Typical alternate areas bounded by these current-carrying loops are designated 18 and 19 in Fig. 6. Due to the direct electric current through the conductors forming the loops of the track, magnetic flux is caused to ascend and descend through alternate loops, as illustrated by the symbolic indications 12 and 11, respectively, of flux rising from area 19 and descending through area 18. A magnetic flux pattern is thus created above the roadway similar to that shown by dotted lines 36 in the vertical sectional view in Fig. 8. When vehicle 6 carrying coils 31 and 31' moves along the track, magnetic flux passes alternately upward and downward through pick-up coils 31 and 31', with resultant generation of alternating voltage between terminals of each terminal pair, 17 and 17', respectively.

The receiving circuit of Fig. 14 is suitable for use with the electromagnetic pick-up coils. Disconnection of the photoelectric cell terminals from input conductors 39, and connection of terminals 17 to the input conductors 39, as well as a similar substitution of the terminal pair 17' in contact with input conductors 39', replacing the output terminals of phototube 21', are the only circuit changes required to render the receiver adaptable to operation with a magnetic track.

Figure 8:
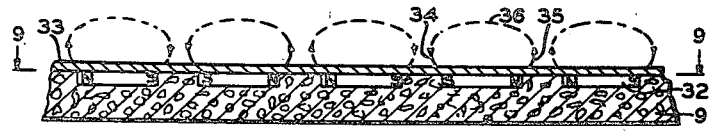
Fig. 8 is a longitudinal sectional view through a road bed embodying a permanent magnet system for magnetic control.
Figure 9:
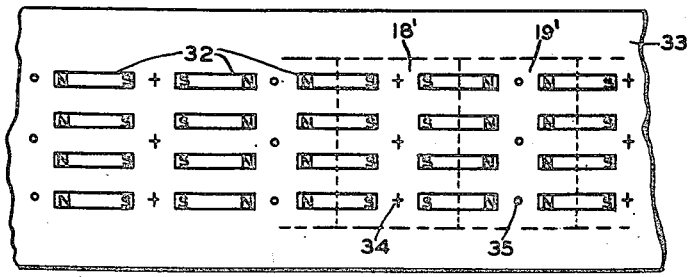
Fig. 9 is a plan of the road bed with top layer thereof removed to show the arrangement of magnets, taken along the line 9—9 of Fig. 8.
Figure 10:
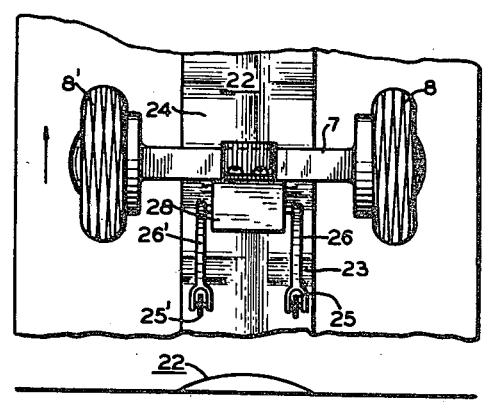
Figs. 10 and 11 are plan view and side elevation, respectively, the latter partly in section, of a mechanical coupling embodiment of the broad principles of this invention.
Figure 11:
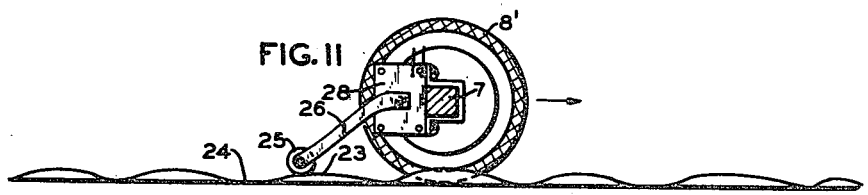
Figure 12:
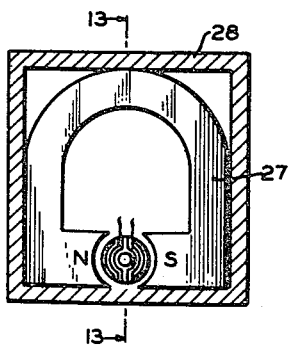
Figs. 12 and 13 are sectional views of the D'Arsonval meter-type dynamo elements used for conversion from mechanical oscillation of the pick-up elements to alternating-current signals for electrical amplification, the latter being taken in the line 13—13 of Fig. 12.
Figure 13:
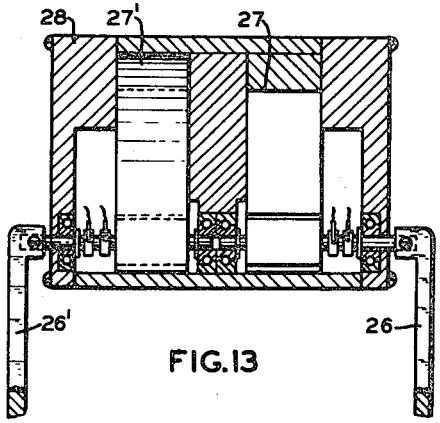

A signalling track producing substantially the same magnetic field distribution above the roadway as the magnetic track of Fig. 6 and Fig. 7, but possessing the advantage of freedom from requirement of an electric power source, is shown in Figs. 8 and 9. The fixed magnetic fields are produced by a series of sets of parallel permanent bar magnets 32. The magnets of a set are similarly polarized, while the magnets of an adjacent set are oppositely polarized, as noted by the pole designations indicated on the magnets. Areas 18' and 19' enclosed in dotted lines are alternate areas of descending flux and ascending flux lines, respectively, as indicated by flux direction arrows 34 and 35. The cooperation of these areas with the pick-up coils 31 and 31' thus corresponds with that of flux areas 18 and 19 bounded by direct-current conductors, as shown in Fig. 6.

Bar magnets of uniform length may be used for an entire signalling track, the spacing of the sets of bars being varied according to the predetermined speeds to be signalled to the vehicle.

An advantage offered by the magnetic signalling system is the independence of the effects produced by foreign matter such as dirt, snow or oil on the road surface.

The elements of an alternating-elevation track and a pair of electro-mechanical pick-up devices are shown in Figs. 10, 11, 12, and 13. Right and left follower arms 26 and 26' are equipped with small wheels 25, 25' adapted to rise and fall over small hills 23 and valleys 24 of a track 22 formed along the surface of a paved road. Arms 26 and 26' are fastened at their opposite ends to the pivoted moving coil assemblies of small permanent-magnet dynamos 28, similar in construction to the well known D'Arsonval moving-coil meter movements. The miniature dynamos are attached to front axle 7 of vehicle 6, replacing the pick-up coils of the magnetic system or the photoelectric cell units of the first described system. As vehicle 6 progresses along track 22, the rapid rising and falling of the follower wheels 25 and 25' causes the armatures of the dynamo units to oscillate through a small angle, in the fields of permanent magnets 27 and 27', producing alternating currents of frequency dependent on the speed of the vehicle relative to the dimensions of the alternate hills and valleys of the track. The movement of the followers over one hill and valley corresponds to one cycle of the generated electromotive forces.

As the vehicle digresses to the right from the predetermined path for which the alternating elevation track is positioned, the right-hand pick-up unit operates along a lower-amplitude section of the track, while the left-hand unit approaches the middle of the track, operating more nearly over the crests of the hills.

In the use of this system with the receiver of Fig. 14, the electro-mechanical pick-up dynamo armatures are connected to the receiver input conductors 39 and 39'; no further changes of the receiver are necessary.

The alternate zones of a vehicle signalling or control track thus may consist of alternate reflective and absorbent areas for photoelectric operation, alternate zones of rising and descending magnetic flux for control by electromagnetic induction, or alternate hills and valleys for a mechanical follower system.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A control system for a steerable vehicle movable along a chain of spaced zones extending along a predetermined path, comprising pick-up means on said vehicle responsive to movement along said spaced zones for producing an alternating signal of frequency varying according to the rate of traversal of said zones and intensity varying according to variations of the course of said vehicle from said predetermined path, frequency-selective speed control means on said vehicle responsive to said alternating signal for varying the speed of said vehicle in accordance with variation of said signal frequency, and amplitude-controlled steering control means on said vehicle responsive to said alternating signal for steering said vehicle in accordance with variation of intensity of said signal.

2. A control system for a vehicle movable relative to a chain of signal elements disposed along a path, comprising means on said vehicle cooperating with the successive elements of said chain to produce successive alternations as said vehicle traverses respective ones of them and thereby producing a continuous alternating signal with an alternation for each element, the frequency of the signal being directly proportional to the vehicle speed, frequency selective means for receiving said alternating signal and producing a control voltage varying according to departure of the frequency of said alternating signal from a predetermined frequency, and means responsive to said control voltage and operatively connected to said vehicle for decreasing the vehicle motive power when the frequency of said alternating signal exceeds said predetermined frequency.

3. The method of controlling the movement of a vehicle along a chain of signal elements variably spaced along a path in such a manner that the number of signal elements per unit length along each portion of the track is inversely proportional to the recommended speed of travel therealong, comprising moving said vehicle along said path, generating an alternating signal having successive alternations corresponding to traversal of successive signal elements, and so varying the speed of said vehicle in accordance with the frequency of said alternating signal as to maintain a predetermined rate of traversal of said signal elements.

4. A control system for a vehicle movable relative to a chain of signal elements disposed along a path, comprising means adapted to be carried by said vehicle and responsive to movement along said signal elements for producing a continuous alternating current characterized by successive alternations corresponding to traversal of successive signal elements, whereby the frequency of said alternating current is proportional to the speed of said vehicle and also to the number of successive signal elements per unit length along said chain, and frequency-responsive means coupled to said signal-producing means and adapted to regulate the speed of said vehicle for varying said speed in inverse proportion to the number of successive signal elements per unit length, whereby said vehicle is controlled in such a manner as to suppress variations of said frequency.

5. In a system for automatic speed control of a vehicle, a track comprising alternate areas along the length thereof, receiving means positioned on said vehicle for cooperation with said areas to produce alternating current in said receiving means during progress of said vehicle along said track, the frequency of said alternating current being directly dependent upon the product of the speed of said vehicle and the number of said areas per unit length, and frequency selective means on said vehicle responsive to said current for decreasing the vehicle motive power as said frequency increases and increasing the vehicle motive power as said frequency decreases to control the speed of said vehicle in accordance with the frequency of said current.

6. A method of regulating the speed of a vehicle proceeding along fixedly-defined successive zones closely and regularly spaced along a track, the number of zones per unit length therealong being different in one region from that in another region and the intermediate zones being graduated in spacing therebetween, the speed regulating method comprising producing in the vehicle an alternating signal comprising successive alternations corresponding to the traversal of the successive respective zones, decelerating the vehicle as the frequency of said signal increases, and accelerating the vehicle as the frequency of said signal decreases, whereby the vehicle speed is varied in accordance with the variations of spacing of the successive zones in the manner to suppress changes of frequency of said alternating signal.

7. A method of regulating the speed of a vehicle proceeding along fixedly-defined successive zones closely and regularly spaced along a track, the number of zones per unit length therealong being different in one region from that in another region and the intermediate zones being graduated in spacing therebetween, the speed regulating method comprising producing in the vehicle an alternating signal comprising successive alternations corresponding to the traversal of the successive respective zones, producing a voltage varying according to departure of the frequency of said alternating signal above or below a predetermined frequency, and varying the speed of said vehicle according to said voltage and thereby suppressing variations of said frequency.

8. The method of regulating the progress of a vehicle according to a chain of fixed signal elements concatenated along successive parts of a vehicle track with variable spacings along successive parts of the track, comprising advancing the vehicle along the chain of signal elements, and varying the speed of the vehicle inversely according to the number of said fixed signal elements per unit length along successive parts of said vehicle track.

9. The method of preparing a vehicle signalling track comprising positionally aligning a chain of signalling elements along said path for successive traversal during vehicle progress therealong and varying the number of said elements per unit length substantially inversely according to the speeds recommended for vehicle operation along successive portions of said chain of elements.

10. Signalling apparatus for producing along a pathway successive magnetic field patterns, comprising permanent magnets positioned in concatenated zones along said pathway, said magnets being so oriented as to produce oppositely directed magnetic field patterns extending from said magnets in successive zones.

11. Signalling apparatus for producing along a pathway successive magnetic field patterns for vehicle speed signalling, comprising permanent magnets positioned in concatenated zones along said pathway, said magnets being so oriented as to produce oppositely directed magnetic field patterns extending from said magnets in successive zones, and the number of successive zones per unit length along successive parts of said pathway being varied in accordance with predetermined vehicle velocities along said successive parts of said pathway.

12. Signalling apparatus for producing along a pathway successive oppositely directed regularly spaced magnetic field patterns comprising a source of direct current, and an electric current conductor connected to said source and arranged along said pathway to form successive current conduction loops therealong having oppositely directed magnetic fields at fixed space intervals.

13. Signalling apparatus along a pathway comprising variably spaced alternate zones of high and low energy reflectivity, said zones being concatenated along a predicted vehicle course along said pathway, and the number of alternate zones per unit length along successive portions of said pathway being varied in accordance with recommended vehicle speeds along said portions.

14. Vehicle speed control apparatus for cooperation with successive oppositely directed magnetic fields regularly spaced along a path of movement of said vehicle, comprising electric current conductor means positioned on said vehicle for generation of alternating currents of frequency proportional to the speed of said vehicle during movement of said vehicle along said path, and alternating-current frequency responsive means coupled to said conductor for reducing the speed of said vehicle as said frequency increases and increasing the speed of said vehicle as said frequency decreases.

15. Apparatus for cooperation with successive zones of alternate electromagnetic energy intensities variably spaced along successive portions of a path of movement of a vehicle to control the speed of said vehicle, comprising means on said vehicle for producing a substantially continuous alternating electromotive force in accordance with traversal of said successive alternate zones during movement of said vehicle along said path, and frequency responsive means coupled to said first means for controlling the speed of said vehicle in accordance with the frequency of said alternating electromotive force.

16. Vehicle path detecting apparatus for cooperation with successive fixed oppositely directed magnetic fields along a track, comprising a first electric current conductor positioned on said vehicle for generation of an alternating current signal during movement of said vehicle along said track, a second electric current conductor positioned on said vehicle in laterally displaced relation to said first conductor for generation of a second alternating current signal during movement of said vehicle along said track, and means for comparing said first and second alternating current signals to detect the path of movement of said vehicle.

17. A control system for a vehicle equipped with steering means and movable along a chain of spaced zones extending along a predetermined path, comprising means on said vehicle responsive to traversal of the successive zones of said path for producing an alternating signal of frequency proportional to the speed of said vehicle along said path and proportional to the number of said zones per unit length along said path, the amplitude of said alternating signal varying according to digression of said vehicle from said path, means on said vehicle responsive to variations of said signal frequency for varying the speed of said vehicle inversely as said frequency varies to maintain a substantially constant rate of traversal of said spaced zones and substantially constant frequency of said signal, and means on said vehicle responsive to amplitude variation of said alternating signal and operatively connected to said steering means for varying the steering of said vehicle according to said amplitude variation to direct said vehicle along said path.

18. A signalling system for a vehicle movable along a chain of spaced zones along a predetermined path, comprising first means carried by said vehicle responsive to movement along said spaced zones for generating a first alternating signal of frequency dependent on the speed of movement along said zones and of intensity dependent on the lateral displacement of said vehicle with respect to said path, further means carried by said vehicle responsive to movement along said spaced zones for generating a second alternating signal of frequency dependent on the speed of movement along said zones and of intensity dependent on the lateral displacement of said vehicle with respect to said path, means differentially responsive to said first means and said further means for producing a steering signal in accordance with the difference of intensities of said first alternating signal and said second alternating signal, and means jointly responsive to said first means and said further means for producing a vehicle velocity signal in accordance with the variations of frequency of said alternating signals.

19. A control system for a motor vehicle movable along a chain of spaced zones extending along a predetermined path, comprising first means on said vehicle responsive to movement along said spaced zones for generating a first alternating signal of frequency dependent on the speed of movement along said zones and of intensity dependent on the lateral displacement with respect to said chain of zones, further means on said vehicle responsive to movement along said spaced zones for generating a second alternating signal of frequency dependent on the speed of movement along said zones and of intensity dependent on the lateral displacement with respect to said chain of zones, said further means being so oriented on said vehicle as to produce differential alternating signal intensity variation with respect to said first means in response to lateral displacement of said vehicle with respect to said chain of zones, means differentially responsive to said first means and said further means for steering said vehicle in accordance with the relative intensities of said first alternating signal and said second alternating signal, and means jointly responsive to said first means and said further means for varying the speed of said vehicle in accordance with variations of frequency of said alternating signals.

20. Speed responsive apparatus for a vehicle movable along a chain of spaced zones, comprising means on said vehicle cooperating with said zones during relative movement between said vehicle and said zones for producing an alternating signal of frequency varying as the product of the speed of relative movement and the number of said zones per unit length along said chain, and frequency-selective means responsive to said alternating signal for producing an output voltage varying in accordance with the frequency and rate-of-change of frequency of said alternating signal.

21. Speed and course responsive apparatus for a vehicle movable along a chain of spaced zones, comprising means on said vehicle cooperating with said zones during relative movement between said vehicle and said zones for producing an alternating signal characterized by a frequency varying as the product of the speed of relative movement and the number of zones per unit length along said chain and also characterized by an amplitude varying according to the divergence between said vehicle and said chain of zones, frequency-selective means responsive to said alternating signal for producing a first output voltage varying in accordance with the frequency and the rate-of-change of frequency of said alternating signal, and means responsive to said alternating signal for producing a second output voltage varying as the amplitude and the rate-of-change of amplitude of said alternating signal.

22. Vehicle signalling apparatus comprising a signalling medium fixed along a vehicle path and providing alternate fixed zones therealong, said signalling medium having straight sections and curved sections of various radii of curvature, the number of zones per unit length being different in some sections of the path from that in other sections, with graduation of the number of zones in intermediate sections for smooth transition therebetween, the number of zones per unit length along the parts of the path being inversely varied according to the predetermined vehicle speeds therealong.

23. Vehicle signalling apparatus comprising a permanent magnetic signalling medium fixed along a vehicle path and providing alternate fixed magnetic fields therealong, said signalling medium having straight sections and curved sections of various radii of curvature, the number of alternate magnetic fields per unit length being different in some sections of the path from that in other sections, with graduation of the number of zones in the intermediate sections for smooth transition therebetween.

24. Vehicle speed control apparatus for cooperating with a signalling medium defining space alternations fixed along a vehicle path and controlling the speed of a power propelled vehicle in accordance therewith, comprising signal pick-up means carried by said vehicle and arranged to cooperate with said medium for producing an alternating signal of frequency varying as the product of the vehicle speed and the number of space alternations per unit length along said medium, and means coupled to said pick-up means and responsive to variations of frequency of said signal for increasing the vehicle motive power as the frequency of said signal decreases and decreasing the vehicle motive power as the frequency increases.

25. The process of deriving a vehicle speed-responsive steady-state alternating signal, comprising operating the vehicle along an extensive chain of regularly spaced fixed oppositely directed magnetic fields at a velocity of a plurality of field traversals per second, and carrying with said vehicle an electrical conductor subjected to said magnetic fields successively by the motion of said vehicle, said last-named step comprising passing said conductor through said magnetic fields at a rate of more than three fields per second and thereby generating a continuing alternating voltage.

26. An extensive series of signal zones extending along a vehicle path for cooperating with vehicles travelling therealong, said series of zones including substantially straight sections and curved sections, the zones being spaced apart with variations of spacing of at least two-to-one ratio between the closest spaced and the widest spaced and the distance per zone being in the range between one inch and 5 feet, the number of zones per unit length along a first section of the path being different from the number of zones per unit length along a second section and the intervening zone spacing being graduated therebetween for smooth transition therebetween as a vehicle progresses from said first section to said second section.

27. An extensive series of signal zones as defined in claim 26, wherein said series of signal zones comprises a series of magnetic fields each directed in a predetermined direction with respect to said series.

28. Vehicle control apparatus for cooperating with a series of regularly spaced zones along a path, comprising signal pick-up means responsive to progress along said series for producing an alternating voltage varying in frequency as the product of the vehicle velocity relative to said series of zones and the number of said zones per unit length, frequency discriminator means coupled to said pick-up means for producing a voltage varying in strength according to variation of said frequency, and means responsive to said voltage for varying the speed of said vehicle according to the variations of said voltage.

29. Vehicle guidance apparatus for producing vehicle guidance signals during progress of the vehicle along a series of alternating zones, comprising pick-up means for producing first and second alternating signals of frequency varying as the product of vehicle speed and the number of alternations per unit length along the series and of relative strengths varying according to lateral position of the vehicle, means for producing differential rate-of-change responsive voltages according to the time rate of change of said first and second alternating signals, and comparator means coupled to said pick-up means and jointly responsive to said first and second alternating signals and to said first and second differential rate-of-change voltages for producing guidance signals varying according to the relative variations of said first and second alternating signals and the relative magnitudes of said differential rate-of-change voltages.

30. Vehicle guidance apparatus for producing vehicle course signals during progress of the vehicle along a series of alternate zones, comprising first and second pick-up means for producing first and second alternating signals of frequency corresponding to the product of vehicle speed and the number of alternations per unit length along the series, and comparator means coupled to said pick-up means and jointly responsive to said first and second alternating signals for steering the vehicle according to said signals, said comparator means comprising means for varying the steering of said vehicle in the direction to maintain amplitude equality between said first and second signals.

THOMAS M. FERRILL, Jr.

REFERENCES CITED

The following references are of record in the file of this patent:

UNITED STATES PATENTS

| Number | Name | Date |
|---|---|---|
| 234,636 | Wenker | Nov. 16, 1880 |
| 1,215,173 | Loughridge | Feb. 6, 1917 |
| 1,387,850 | Hammond, Jr., | Aug. 16, 1921 |
| 1,490,253 | Blosky | Apr. 15, 1924 |
| 1,575,579 | Howe | Mar. 2, 1926 |
| 1,703,280 | Minorsky | Feb. 26, 1929 |
| 1,710,496 | Day | Apr. 23, 1929 |
| 1,742,189 | Adams | Jan. 7, 1930 |
| 1,754,685 | Kanter | Apr. 15, 1930 |
| 1,767,609 | Murray | June 24, 1930 |
| 1,803,288 | Adler, Jr. | Apr. 28, 1931 |
| 2,019,976 | Huebscher | Nov. 5, 1935 |
| 2,074,251 | Braun | Mar. 16, 1937 |
| 2,133,285 | Dunmore | Oct. 18, 1938 |
| 2,163,520 | Richards | June 20, 1939 |
| 2,172,313 | Young | Sept. 5, 1939 |
| 2,178,237 | Linder | Oct. 31, 1939 |
| 2,236,431 | Hollingsworth et al. | Mar. 25, 1941 |
| 2,248,473 | Franklin | July 8, 1941 |
| 2,317,400 | Paulus et al. | Apr. 27, 1943 |
| 2,321,874 | Tandler et al. | June 15, 1943 |
| 2,331,144 | Sitter | Oct. 5, 1943 |
| 2,339,291 | Paulus et al. | Jan. 18, 1944 |
| 2,404,984 | Powers | July 30, 1946 |
| 2,419,970 | Roe et al. | May 6, 1947 |
| 2,423,337 | Moseley | July 1, 1947 |